May 5, 1964 R. D. OWINGS ETAL 3,131,462
METHOD OF RETAINING AND LOCATING A PAIR OF
PERMANENTLY-MAGNETIC TUBULAR SEGMENTS
WITHIN AN OUTER CONCENTRIC SLEEVE
Filed Jan. 15, 1962 2 Sheets-Sheet 1
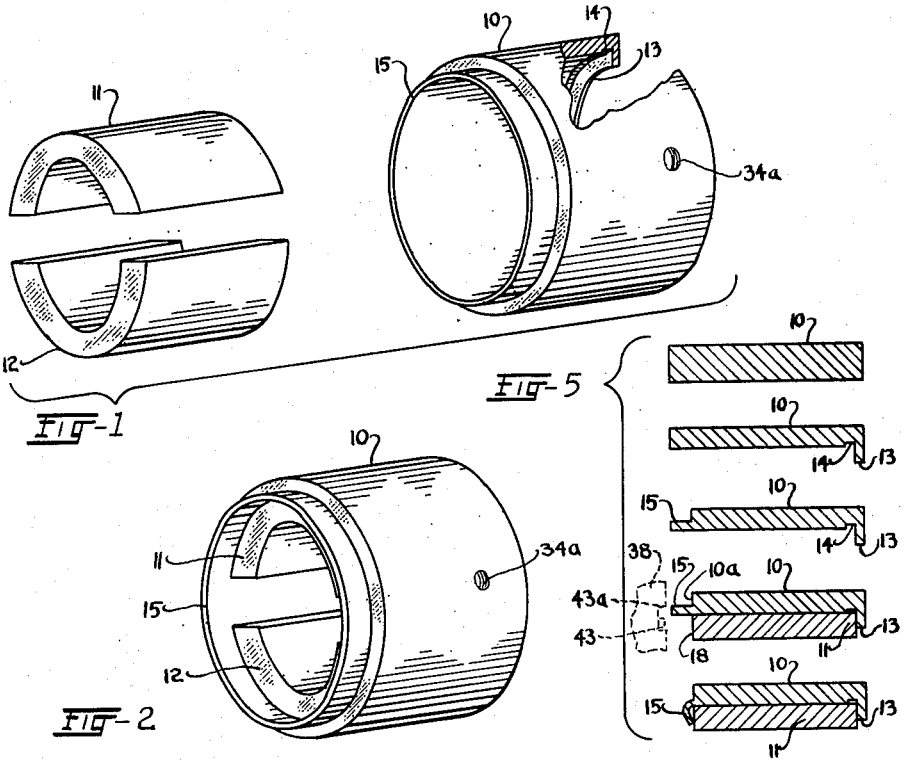
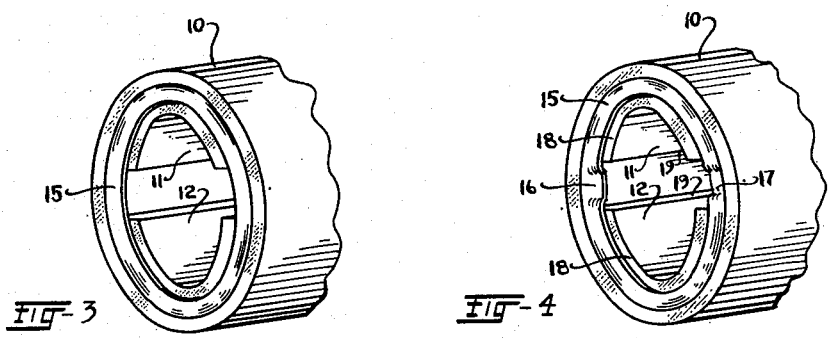
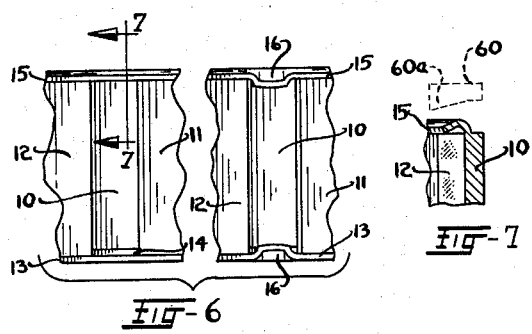
RAYMOND D. OWINGS
LEONARD U. ALSRUHE
            INVENTORS
BY
    Leonard Bloom
        Attorney

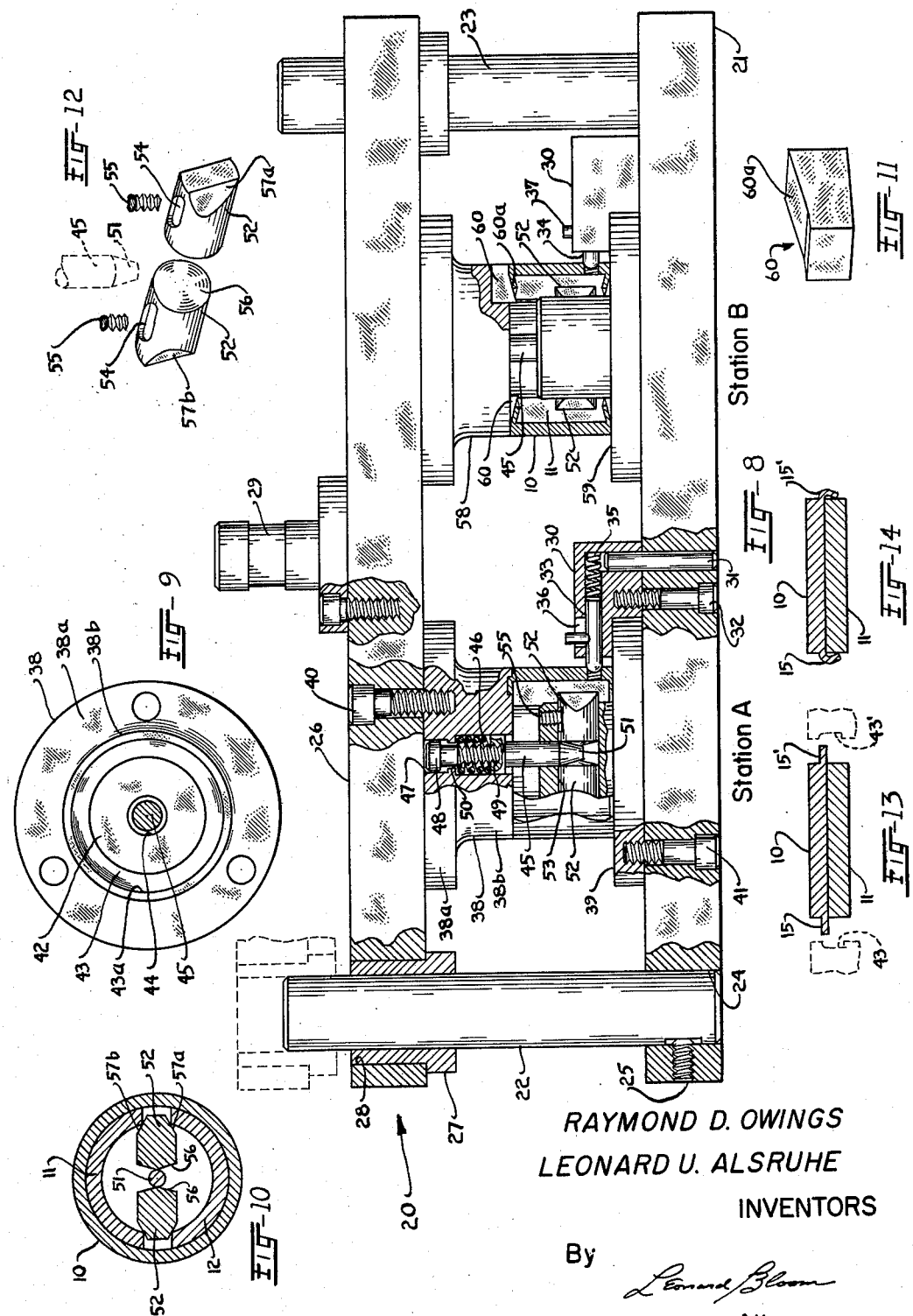

United States Patent Office 3,131,462
Patented May 5, 1964

3,131,462
METHOD OF RETAINING AND LOCATING A PAIR OF PERMANENTLY-MAGNETIC TUBULAR SEGMENTS WITHIN AN OUTER CONCENTRIC SLEEVE
Raymond D. Owings and Leonard U. Alsruhe, Towson, Md., assignors to The Black and Decker Manufacturing Company, Towson, Md., a corporation of Maryland
Filed Jan. 15, 1962, Ser. No. 167,216
5 Claims. (Cl. 29—155.59)

The present invention relates to a method of retaining and locating a pair of permanently-magnetic tubular segments within an outer concentric sleeve, and more particularly, to such a method which will result in a permanent magnet sub-assembly suitable for use as the stationary field of a high-efficiency direct current electric motor. Such a motor is described more particularly in the co-pending Riley et al. application Ser. No. 156,625, filed December 4, 1961, entitled "Cordless Electric Device Having High-Efficiency Direct Current Electric Motor Utilizing Permanently-Magnetic Tubular Segments," and assigned to the same assignee as that of the present invention.

It is an object of the present invention to provide a method of retaining and locating a pair of permanently-magnetic tubular segments within an outer concentric sleeve, wherein the segments will be retained and located both axially, radially and circumferentially within the sleeve, and wherein a considerable savings in material cost and assembly time will be realized.

In accordance with a preferred embodiment of the present invention, an outer concentric sleeve is provided, which is of a magnetically-conducting material, and which will receive therein a pair of diametrically opposite permanently-magnetic tubular segments circumferentially spaced from one another. At one end of the sleeve, an inturned annular flange is formed at right angles to the sleeve; and at the opposite end of the sleeve, an axially-extending annular flange is formed, which has an inner diameter substantially coincident with the inner diameter of the sleeve. The pair of tubular segments, which are dimensionally identical to each other, are inserted within the sleeve to abut internally against the inturned annular flange of the sleeve, such that the segments are flush against the interior wall of the sleeve, and such that the segments are diametrically opposite from one another and are circumferentially spaced from one another. The axially-extending annular flange of the sleeve is swaged over radially inwardly towards the axis of the sleeve, thereby retaining the segments axially within the sleeve. Next, a pair of diametrically-opposite shallow depressions are formed on each of the annular flanges. Each one of the depressions is circumferentially intermediate of the tubular segments, and each of the depressions is directed inwardly of the sleeve, thereby retaining and locating the segments radially and circumferentially within the sleeve. This method is especially suited for use in conjunction with automatic machinery and high-speed machine tools, such that a considerable savings is realized.

These and other objects of the present invention will become apparent from a reading of the following specification, taken in conjunction with the enclosed drawings, in which:

FIGURE 1 is an exploded perspective view of the outer sleeve and of the pair of tubular segments, with part of the sleeve being broken away to show the annular inturned flange;

FIGURE 2 is a perspective view showing the segments inserted within the sleeve;

FIGURE 3 is a partial perspective view showing the axially-extending annular sleeve swaged over to retain the segments axially within the sleeve;

FIGURE 4 is a partial perspective view showing the succeeding operation of forming a pair of diametrically-opposite shallow depressions circumferentially intermediate of the segments, thereby retaining and locating the segments radially and circumferentially within the sleeve;

FIGURE 5 is a sequence drawing, showing a longitudinal section of the sleeve, and showing the successive stages in the initial operation of forming the annular flanges and retaining the segments axially within the sleeve;

FIGURE 6 is a sequence drawing, showing the segments in elevation as viewed from the interior of the sleeve, and showing the successive stages in the next operation of forming a pair of shallow depressions on each of the annular flanges;

FIGURE 7 is a section view taken along the lines 7—7 of FIGURE 6 and showing in broken lines the punch for forming one of the shallow depressions;

FIGURE 8 is a front elevation of a two-position fixture for performing the various operations, the fixture being in the "down" position, with parts being broken away and sectioned to show the inner construction, and with the outer sleeve and tubular segments being shown in each of the two positions of the fixture;

FIGURE 9 is a section view taken along the lines 9—9 of FIGURE 7, showing the formation of the die for swaging over the axially-extending flange;

FIGURE 10 is a section view taken along the lines 10—10 of FIGURE 9, showing the means for securely clamping and locating the segments within the sleeve during the operations;

FIGURE 11 is a perspective view of one of the punches used for forming the shallow depressions;

FIGURE 12 is a perspective view of the wedges used for clamping the segments within the sleeve while the operations are being performed, the broken lines indicating the plunger which cooperates with the wedges, with the set screws for limiting the radial sliding movement of the wedges also being shown in exploded relationship to the wedges;

FIGURE 13 illustrates a modification, wherein a pair of axially-extending annular flanges, one on each end of the sleeve, are swaged over simultaneously to retain the segments axially within the sleeve; and FIGURE 14 corresponds to FIGURE 13 and illustrates the completed form of the pair of swaged-over annular flanges.

With reference to FIGURES 1 through 3, and with reference to FIGURE 5, an outer concentric sleeve 10 (of a magnetically-conducting material) cooperates with a pair of permanently-magnetic diametrically-opposite tubular segments 11 and 12 to form a permanent magnet field for a high-efficiency direct current electric motor. Each of the segments 11 and 12 is dimensionally identical to the other and may be formed from a ceramic material, which serves as a matrix for finely-divided powdered ferrite particles entrapped therein. In the process of machining the internal diameter of the sleeve 10, which may be performed on an automatic screw machine, an inturned annular flange 13 may be formed conveniently on the sleeve 10; and as shown in FIGURE 5, an undercut 14 may also be formed adjacent to flange 13, thereby facilitating a sharp edge on the flange 13. Next, an axially-extending annular flange 15 is formed on the opposite end of the sleeve 10, the flange 15 having an inner diameter which is substantially coincident with the inner diameter of the sleeve 10. The segments 11 and 12 are inserted within the sleeve 10 to abut against the flange 13 (see FIGURE 5), such that the segments 11 and 12 are flush against the interior wall of the sleeve 10, and such that the segments 11 and 12 are diametrically opposite one another and are circumferentially spaced from one another, as shown more particularly in FIGURE 2. Moreover, the end face 18 of the segment, as for example segment 11, will be substantially coterminous with the respective end face 10a (of the sleeve 10) which is adjacent to the axially-extending annular flange 15. The axially-extending annular flange 15 is then swaged over against the exposed end faces 18 of the segments 11 and 12, as shown more particularly in FIGURE 5, such that the segments 11 and 12 are retained axially within the sleeve 10 as is shown in the perspective view of FIGURE 3.

With reference to FIGURES 4, 6 and 7, the next operation comprises forming a pair of shallow depressions 16 and 17 on each of the annular flanges 13 and 15 of the sleeve 10. The depressions 16 and 17 are formed by means of a plurality of punches, one of which is shown in broken lines as at 60 in FIGURE 7. The depressions 16 and 17 are diametrically opposite from one another, see FIGURE 4, and the depressions 16 and 17 retain and locate the segments 11 and 12 radially and circumferentially within the sleeve 10. As shown more particularly in FIGURE 4, the depressions 16 and 17 each physically engage the respective edges between the flat end faces 18 and the flat axial faces 19 of the segments 11 and 12; and moreover, each of the depressions 16 and 17 is directed inwardly of the sleeve 10, being convex with respect to the interior of the sleeve 10.

With reference to FIGURES 8 through 14, a fixture 20 is provided for performing the operations herein noted. The fixture 20 has a first station A for swaging-over the flange 15, and a second station B for forming the shallow depressions 16 and 17 in each of the flanges 13 and 15. The fixture 20 includes a base 21 having a pair of columns 22 and 23 secured thereto. The columns 22 and 23 are press-fitted within bores (one of which is shown as at 24) within the base 21 and retained therein by set screws 25. The fixture 20 further includes a top plate 26 which is movable vertically on the columns 22 and 23. Bushings (as at 27) are press-fitted within bores (as at 28) within the top plate 26 for facilitating vertical movement of the top plate 26. Means including a rod 29 secured to the top plate 26 is used for coupling the fixture 20 to a conventional power-operated ram, the ram not being shown herein for ease of illustration. The fixture 20 is shown in its "down" position, that is to say, at the completion of the operations; and the partial broken lines (adjacent to column 22) indicate the approximate amount of vertical movement.

As shown more particularly in FIGURE 8, means are provided for locating the sleeve 10 in each of the stations A and B. Such means comprises a detent carrying member 30 located accurately with respect to the base 21 by means of a dowel 31 and secured to the base 21 by means of a plurality of screws, one of which is shown as at 32. The member 30 has a bore 33 within which a spring-loaded slidable detent pin 34 is received. The detent pin 34 is urged out of the bore 33 by means of a spring 35, but is precluded from being expelled from the bore 33 by means of a slot 36 formed in the member 30 and a transverse pin 37 secured to the detent pin 34. The detent pin 34 projects beyond the member 30 to be received within a hole 34a formed within the sleeve 10.

With reference to FIGURES 8 and 9, the first station A has a die 38 and an aligned support 39. The die 38 is secured to the underside of the top plate 26 by a plurality of screws, as at 40, while the support 39 is secured to the base 21 by a plurality of screws, as at 41. Both the die 38 and the support 39 are accurately located by means of a plurality of dowels, which are not shown herein for ease of illustration. As shown more clearly in FIGURE 9, the die 38 has a flat forward face 42 which includes an annular groove 43 formed therein. As shown by the broken lines in FIGURE 5, the annular groove 43 of the die 38 has a curved outer portion 43a which facilitates the swaging over of the axially-extending flange 15 radially inwardly towards the axis of the sleeve 10.

With reference to FIGURES 8, 9, and 10, the die 38 has a flanged portion 38a and a collar portion 38b depending therefrom. The collar portion 38b has an axial bore 44 within which a plunger 45 is slidably received, being urged outwardly by a spring 46. The flange portion 38a has an aligned communicating axial bore 47 within which a screw 48 is slidably received. The screw 48 passes down within the spring 46 to be received within a tapped hole 49 formed in the head of the plunger 45. The spring 46 urges the plunger 45 out of the bore 44, but the head of the screw 48 abuts against an inwardly-directed annular flange 50 to preclude the screw 48 and plunger 45 from being withdrawn from the die 38.

Moreover, the plunger 45 has a frusto-conical forward portion 51 which cooperates with a pair of cylindrical wedges 52 to releasably secure and locate the tubular segments 11 and 12 within the sleeve 10 while the operations are being performed. The wedges 52 are slidably mounted in a transverse bore 53 formed within the support 39. The wedges have a limited radial sliding movement with respect to the support 39, the degree of movement being determined by a slot 54 formed on the top of each wedge 52 to cooperate with a set screw 55 carried by the support 39. The wedges 52 are shown in perspective view in FIGURE 12. Each of the wedges 52 has a conical rear portion 56 which cooperates with the frustro-conical portion 51 of the plunger 45 to advance the wedges 52 radialy as the plunger 45 is lowered into the support 39. The plunger 45 is carried by the die 38, which is secured to the top plate 26; and the plunger 45 is lowered as the top plate 26 is depressed. The plunger 45 thus exerts a radial force on each of the wedges 52, and the wedges 52 in turn exert a clamping force on the tubular segments 11 and 12. As shown more clearly in FIGURE 10, each of the wedges 52 has a pair of chamfered flats 57a and 57b which are received circumferentially intermediately of the segments 11 and 12, thus exerting a radial clamping force against the side edges of the flat axial faces 19 of the segments 11 and 12. Thus, the segments 11 and 12 are releasably clamped within the sleeve 10, and also, the segments 11 and 12 are located circumferentially and radially with respect to each other while the operations are being performed in stations A and B.

With reference to FIGURES 8 and 11, the succeeding operation in station B, which forms the shallow depressions 16 and 17 intermediately of the annular flanges 13 and 15 on the sleeve 10, is performed to the right of station A. In this succeeding operation, the outer sleeve 10 is again located in the fixture 20 by means of another detent coupling member 30, which is identical to that as previously described for station A, and which has its own detent pin 34 received in the opening 34a of the sleeve 10. Moreover, the manner of releasably clamping and locating the segments 11 and 12 is identical to that as previously described for station A and includes the wedges 52 and plunger 45. In station B, a die 58 is accurately located and secured to the underside of the top plate 26 and cooperates with an aligned die support 59, which is in turn accurately located and secured to the base 21. Both the die 58 and die support 59 carry a pair of punches 60 secured thereto. A perspective view of one of the punches 60 is illustrated in FIGURE 11. Each of the punches 60 has a diverging forward portion 60a, which projects radially inwardly of the sleeve 10, and which (as shown by the broken lines in FIGURE 7) is adapted to engage the portion of the annular flanges 13 and 15 circumferentially intermediate of the segments 11 and 12 to form the aforesaid shallow depressions 16 and 17. There are four punches 60 used in station B, two of which are carried by the die 58, and two of which are carried by the die support 59, as shown in FIGURE 8.

Stations A and B of the fixture 20 may be loaded by the operator when the top plate 26 is in its raised position. The outer sleeve 10 and a pair of segments 11 and 12 are loaded in station A, which swages over the axially-extending annular flange 15 to retain the segments 11 and 12 axially in the sleeve 10. The assembly, as thus produced by station A, is then advanced to station B; and a new sleeve 10 and pair of segments 11 and 12 are loaded in station A. The operations in stations A and B may thus be performed simultaneously by the downward movement of the top plate 26. In station B, the four punches 60 form the dual pair of shallow depressions 16 and 17 on the flanges 13 and 15, respectively, thus retaining and locating the tubular segments 11 and 12 radially and circumferentially within the sleeve 10. The assembly, as released from station B, may thus be utilized as the permanent magnet field of a high-efficiency direct current electric motor suitable for use in a battery-operated cordless electric device, as hereinbefore noted.

If desired, the sleeve 10 could be provided initially with a pair of axially-extending annular flanges 15 and 15' as shown in FIGURE 13; and in station A, both of the flanges 15 and 15' could be swaged over simultaneously, and radially inwardly (as shown in FIGURE 14) to retain the segments 11 and 12 axially within the sleeve 10. In such case, the support 39 (of station A) would be similar to die 38 in that each would have an annular groove 43 and 43' formed therein to swage over the flanges 15 and 15', respectively. The succeeding operation in station B, however, would still be identical to that as previously described.

Obviously, many modifications may be made without departing from the basic spirit of the present invention; and accordingly, within the scope of the appended claims, the invention may be practiced other than has been specifically described.

We claim:
1. The method of retaining and locating a pair of permanently-magnetic tubular segments within an outer concentric sleeve, which comprises the steps of:
(a) inserting the pair of tubular segments within the sleeve, such that the segments are flush against the interior wall of the sleeve, and such that the segments are diametrically opposite from one another and are circumferentially spaced from one another;
(b) retaining the segments axially within the sleeve by means of a pair of annular flanges, one at each end of the sleeve, and each of the flanges being integral with the sleeve and extending radially inwardly beyond the internal diameter of the sleeve; and
(c) forming a pair of diametrically-opposite shallow depressions on each of the annular flanges, each of the depressions being circumferentially intermediate of the tubular segments, and each of the depressions being directed inwardly of the sleeve, thereby retaining and locating the segments radially and circumferentially within the sleeve.

2. The method of retaining and locating a pair of permanently-magnetic tubular segments within an outer concentric sleeve, which comprises the steps of:
(a) forming an inturned annular flange at one end of the sleeve, the flange being formed at right angles to the axis of the sleeve;
(b) forming an axially-extending annular flange at the opposite end of the sleeve, the flange having an inner diameter which is substantially coincident with the inner diameter of the sleeve;
(c) inserting the pair of tubular segments within the sleeve to abut internally against the inturned annular flange of the sleeve, such that the segments are flush against the interior wall of the sleeve, and such that the segments are diametrically opposite from one another and are circumferentially spaced from one another;
(d) swaging over the axially-extending annular flange radially inwardly towards the axis of the sleeve, thereby retaining the segments axially within the sleeve; and
(e) forming a pair of diametrically-opposite shallow depressions on each of the annular flanges, each of the depressions being circumferentially intermediate of the tubular segments, and each of the segments being directed inwardly of the sleeve, thereby retaining and locating the segments radially and circumferentially within the sleeve.

3. The method as defined in claim 2, wherein:
(a) the segments, when inserted in the sleeve, each has a respective end face which is substantially coterminous with the end face of the sleeve adjacent to the axially-extending flange; and wherein,
(b) the axially-extending flange is swaged over at substantially right angles to its initial position.

4. The method of retaining and locating a pair of permanently-magnetic tubular segments within an outer concentric sleeve, which comprises the steps of:
(a) forming an axially-extending annular flange at each end of the sleeve, each of the flanges having an inner diameter which is substantially coincident with the inner diameter of the sleeve;
(b) inserting the pair of tubular segments within the sleeve, such that the segments are flush against the interior wall of the sleeve and have respective end faces which are substantially coterminous with the respective end faces of the sleeve adjacent to the axially-extending flanges;
(c) swaging over the axially-extending annular flanges of the sleeve radially inwardly towards the axis of the sleeve, retaining the segments axially within the sleeve; and
(d) forming a pair of diametrically-opposite shallow depressions on each of the annular flanges, each of the depressions being circumferentially intermediate of the tubular segments, and each of the depressions being directed inwardly of the sleeve, thereby retaining and locating the segments radially and circumferentially within the sleeve.

5. The method according to claim 4, wherein:
(a) each of the depressions is convex with respect to the interior of the sleeve; and wherein:
(b) each of the depressions physically contacts the respective edges between the flat end faces and the flat axial faces of the segments, thereby to retain and locate the segments radially and circumferentially within the sleeve.

References Cited in the file of this patent
UNITED STATES PATENTS

| | | |
|---|---|---|
| Re. 20,690 | Simons | Apr. 5, 1938 |
| 2,127,982 | Northup et al. | Aug. 23, 1938 |
| 2,434,008 | Osborn | Jan. 6, 1948 |
| 2,460,639 | Grout | Feb. 1, 1949 |
| 2,638,664 | Maxson | May 19, 1953 |
| 2,830,642 | Wallberg | Apr. 15, 1958 |